United States Patent
Carlson et al.

(10) Patent No.: US 10,965,710 B1
(45) Date of Patent: Mar. 30, 2021

(54) DYNAMIC PIN CONFIGURATOR

(71) Applicant: Cipherloc Corporation, Buda, TX (US)

(72) Inventors: Albert Henry Carlson, Buda, TX (US); Robert LeBlanc, Buda, TX (US); Carlos Gonzales, Buda, TX (US); Robert Carlson, Buda, TX (US)

(73) Assignee: Cipherloc, Inc, Buda, TX (US)

( * ) Notice: Subject to any disclaimer, the term of this patent is extended or adjusted under 35 U.S.C. 154(b) by 287 days.

(21) Appl. No.: 15/873,085

(22) Filed: Jan. 17, 2018

(51) Int. Cl.
  *H04L 29/06* (2006.01)
  *H04L 9/08* (2006.01)
  *H04L 9/12* (2006.01)

(52) U.S. Cl.
  CPC ........ *H04L 63/1441* (2013.01); *H04L 9/0841* (2013.01); *H04L 9/0869* (2013.01); *H04L 9/12* (2013.01); *H04L 63/0428* (2013.01)

(58) Field of Classification Search
  CPC . H04L 63/1441; H04L 9/0841; H04L 9/0869; H04L 9/12

USPC ........................................................ 713/171
See application file for complete search history.

(56) References Cited

U.S. PATENT DOCUMENTS

| 9,178,514 | B1* | 11/2015 | Carlson | H03K 19/0175 |
| 9,425,954 | B1* | 8/2016 | Chalker | H04L 9/0668 |
| 10,122,684 | B1 | 11/2018 | Carlson et al. | |
| 10,162,985 | B1 | 12/2018 | Carlson et al. | |

\* cited by examiner

*Primary Examiner* — Shih-Hon (Eric) Chen
*Assistant Examiner* — Dereena T Cattungal
(74) *Attorney, Agent, or Firm* — Richard L. Moseley

(57) ABSTRACT

A method and apparatus to protect the coded signals sent over physical twisted-pair wiring or between two (2) or more LANs connected by a Wide Area Network (WAN), from unauthorized electronic circuit/wiring monitoring. This is accomplished by varying the assignments of the standard Registered Jack communication pins, varying the transmission speed, inserting meaningless or unrelated data, encrypting data before it is sent or changing network protocol(s) on behalf of the communications adapter/controller of each computer to which it is attached on those LANs.

3 Claims, 9 Drawing Sheets

Standard: 10 Base-T

Standard: IBM Token Ring

Version 2: 10 Base-T

Version 2: IBM Token Ring

Version 225: 10 Base-T

Version 225: IBM Token Ring

Note: View is of a female connector, looking from the open end.

DYNAMIC PIN CONFIGURATOR

BACKGROUND OF THE INVENTION

Field of the Invention

The CipherLoc® Dynamic Pin Configurator is generally related to the field of computer network communications more particularly using varied pin assignments, varied transmission speed and encryption processes to prevent unauthorized access. It is an external device that can be added to Local Area Network (LAN) attached devices and is designed to help protect the coded signals sent over physical twisted-pair wiring or between two (2) or more LANs connected by a Wide Area Network (WAN), from unauthorized electronic circuit/wiring monitoring. This is accomplished by varying the assignments of the standard Registered Jack communication pins, varying the transmission speed, inserting meaningless or unrelated data, encrypting data before it is sent or changing network protocol(s) on behalf of the communications adapter/controller of each computer to which it is attached on those LANs.

Related Information

Hackers have gotten more sophisticated and capable over the years and have developed many methods of attack for penetrating the physical perimeter and the electronic perimeter defenses and once inside, obtaining the information being protected. This has led to the ever increasing use of cryptography by using encryption algorithms and a secret "key", one that is hard to guess to ensure secrecy that is shared by those people who are legitimate parties to the data. But messages encrypted using these encryption algorithms have been, and are, readily broken because the solution space is not as large as previously thought due to the existence of equivalent keys that give rise to "isomorphs", repetition and language patterns and/or the ciphers are susceptible to heuristic attacks.

The use of field programmable array chips for dynamic pin reassignment as used in rerouting internal signals within a computer is disclosed in commonly owned U.S. Pat. No. 9,178,514 which is hereby incorporated by reference. Additionally the simulation of filed gate array chips is disclosed in co owned patent application Ser. No. 15/206,438 filed on Jul. 11, 2016 and which is also hereby incorporated by reference.

SUMMARY OF THE INVENTION

The CipherLoc Dynamic Pin Configurator (CLDPC) offers protection from Intruders for Local Area Networks. The Dynamic Pin Configurator utilizes unique, advanced electronic circuitry, combined with modern microprocessors, metering devices, user interfaces and memory to analyze LAN circuit data traffic for every data transmission event. Then, at the point of transmission, it utilizes the circuit data analysis and microscopic phenomena that generate low-level, statistically random "noise" signals to develop unique configurations for pin assignments on its' internal 8P8C connector and, then, transmits the data. It, then, utilizes the circuit data analysis to develop unique RJ45 pin assignments at the point of transmission and transmits the data. At the point of reception, it reverses the process, discerns the correct RJ45 pin assignments and makes the correct pin assignments for accurate data interpolation. Capabilities include Intruder neutralization, isolation and spoofing with cryptonulls, changing network protocols and varying transmission time and speeds, thus, providing LAN administrators an effective method to control intruder presence. The CipherLoc Dynamic Pin Configurator can be a standalone device on each computer and/or network device within a LAN or built into the network adaptor of each computer and/or network device deployed on the same LAN. When the invention is combined with other technology, such as the CipherLoc Polymorphic Key Progression Algorithmic Cipher Engine, the fact that an Intruder has successfully captured a bit stream makes little difference because they will have no idea what the bit stream actually means.

BRIEF DESCRIPTION OF THE DRAWING

FIG. 1-2 is a schematic diagram of a typical installation of the invention shown in FIG. 1-1 wherein the invention is connected to a typical computer (item 2) via a standard 8P8C, male terminated on both ends, and then connected to a wired network via an identical 8P8C, male terminated on both end, cable.

FIG. 1-3 is a detailed schematic diagram of a typical computer network in which various embodiments of the present invention have been implemented and shows an Intruder presence.

FIG. 1-4 thru 1-7 are schematic diagrams of the process-flow employed by the invention.

FIG. 1-8 is a schematic diagram of the various processes involved in transmitting data from one computer to another using the present invention with the Open Systems Interconnection model (OSI model) which characterizes and standardizes the communication functions of a telecommunication or computing system without regard to their underlying internal structure and technology.

FIG. 2-1 is a schematic wiring diagram of the industry standard 10 Base-T Ethernet terminated into an industry standard 8P8C connector using industry standard pin assignments.

FIG. 2-2 is a schematic wiring diagram of the industry standard 10 Base-T Ethernet terminated into an industry standard 8P8C connector using a different pin assignment methodology as prescribed by base level embodiment of the present invention.

FIG. 2-70 is a schematic wiring diagram of the industry standard 10 Base-T Ethernet terminated into an industry standard 8P8C connector using a different pin assignment methodology as prescribed by the maximum level embodiment of the present invention.

FIG. 3-1 is a schematic wiring diagram of the industry standard IBM Token Ring terminated into an industry standard 8P8C connector using industry standard pin assignments.

FIG. 3-2 is a schematic wiring diagram of the industry standard IBM Token Ring terminated into an industry standard 8P8C connector using a different pin assignment methodology as prescribed by base level embodiment of the present invention.

FIG. 3-70 is a schematic wiring diagram of the industry standard IBM Token Ring terminated into an industry standard 8P8C connector using a different pin assignment methodology as prescribed by the maximum level embodiment of the present invention.

DETAILED DESCRIPTION OF THE INVENTION

Figure 1:
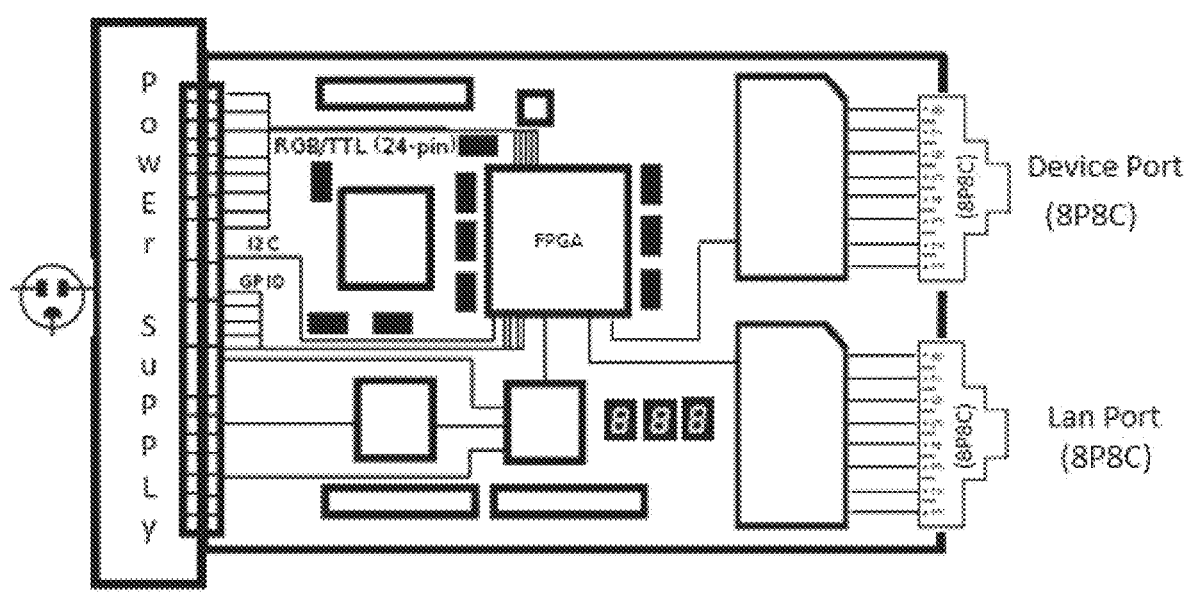
FIG. 1-1 is a schematic diagram of a representative embodiment of the invention with standard (8P8C) connectors.

The following terms and their definitions will be used to describe the invention on the following pages.

Terms

Network or Computer Network—refers to a group of computing hardware devices, such as laptop computers, desktop computers and servers, that are linked together through physical wiring, special purpose electronic devices and connections that offer electronic communication channels to facilitate communications between the computing hardware and to share resources among a wide range of users. Networks are commonly categorized based on their characteristics.

Local Area Network—refers to a computer network that interconnects computers within a limited area such as a residence, school, laboratory, university campus or office building and has its network equipment and interconnects locally managed. It is commonly referred to as a LAN.

External Network—refers to a dynamic network that includes all network addresses not explicitly included in any other network. The network definition changes dynamically when other networks are defined and modified. It cannot be directly modified or deleted. The External network generally represents the Internet.

External Port—refers to a connection point or interface between a computer and an external device such as modems, printers, ice and other devices.

Node—refers to a basic unit used in computer science consisting of a device or data point on a larger network used either as a connection point, a redistribution point, or a communication endpoint. Devices such as a personal computer, cell phone, printers and data terminal equipment are nodes.

Module—in computer terms, refers to a selection of independent electronic circuits packaged onto a circuit board to provide a basic function within a computer. An example might be an inverter or flip-flop, which would require two or more transistors and a small number of additional supporting devices.

Generator—in computer science, a generator is a special routine that can be used to control the iteration behavior of a loop and can be hardware, firmware or software based. In fact, all generators are iterators.

Electronic Communications—means any transfer of signs, signals, writing, images, sounds, data, or intelligence of any nature transmitted in whole or in part by a wire, radio, electromagnetic, photo-electronic or photo-optical system.

Obscuring—altering network communications from an expected form. This can include encrypting. It can also include altering the manner in which the network communication is transmitted. Multiple methods may be employed to obscure the same network communication. A number of possible methods for obscuring will be described.

Revealing—means to restore an obscured network communication to its expected form. Communication Channel, Path or Line and a Network Channel, Path, or Line—refer either to a physical transmission medium such as a wire, or to a logical connection over a multiplexed medium such as a radio channel for the purpose of conducting electronic communications between two or more devices in the computer network in either digital or analog formats.

Idempotent—in mathematics and computer science, is the property of certain operations that can be applied multiple times without changing the result beyond the initial application.

Industry Standard—an established norm or requirement in regard to technical systems and it is usually codified into formal document that establishes uniform engineering or technical criteria, methods, processes and practices.

Open Systems Interconnection Model—(OSI Model) characterizes and standardizes the communication functions of a telecommunication or computing system without regard to their underlying internal structure and technology to achieve interoperability of diverse communication systems with standard protocols. The model partitions a communication system into abstraction layers:

| | Layer | Protocol data unit (PDU) | Function |
|---|---|---|---|
| Host Layers | 7. Application | | High-level APIs incluiding Resource sharing, remote file access |
| | 6. Presentation | Data | Translation of data between a net-Woking service and an application |
| | 5. Sessions | | Managing communication sessions, i.e. Continuous exchange |
| | 4. Transport | Segment (TCP) Datagram (UDP) | Reliable transmission of data between Points n a network, including addressing, routing and traffic control. |
| | 3. Network | Packet | Structuring and managing a multi-node Network, including addresing, routing and traffic control |
| Media Layers | 2. Data link | Frame | Reliable transmission of data frames between two nodes connected by a physical layer |
| | 1. Physical | Bit | Transmission and reception of raw bit Streans ver a physical medium |

At each level N, two entities at the communicating devices (layer N peers) exchange protocol data units (PDUs) by means of a layer N protocol. Each PDU contains a payload, called the service data unit (SDU), along with protocol-related headers and/or footers.

Data processing by two communicating OSI-compatible devices is done as such:
1. The data to be transmitted is composed at the topmost layer of the transmitting device (layer N) into a protocol data unit (PDU).
2. The PDU is passed to layer N−1, where it is known as the service data unit (SDU).
3. At layer N−1 the SDU is concatenated with a header, a footer, or both, producing a layer N−1 PDU. It is then passed to layer N−2.
4. The process continues until reaching the lowermost level, from which the data is transmitted to the receiving device.
5. At the receiving device the data is passed from the lowest to the highest layer as a series of SDUs while being successively stripped from each layer's header and/or footer, until reaching the topmost layer, where the last of the data is consumed.

Some orthogonal aspects, such as management and security, involve all of the layers. These services are aimed at improving confidentiality, integrity, and availability of the transmitted data. In practice, the availability of a communication service is determined by the interaction between network design and network management protocols.

Telecommunications Protocol—a set of rules that allow two or more entities of a communications system to transmit information via any kind of variation of a physical quantity. These are the rules or standard(s) that define the syntax, semantics and synchronization of communication and possible error recovery methods. Protocols may be implemented by hardware, software, or a combination of both.

Pin Assignment—functional assignment of a connector's pins such that each contact of the connector must mate with the contact on the other connector that has the same function, thus, avoiding contacts of disparate functions (which could cause circuit failure and possible resulting damage).

Network Communications—includes all the communications broadcast and received at each end of a communication path.

Data Stream—refers to all electronic communication between a network of two or more devices.

Cryptonulls—meaningless and/or unrelated data or patterns inserted into communications to confuse hackers and intruders.

Time-To-Live—a mechanism that limits the lifetime of data or processes in a computer or network. Often referred to as TTL, it may be implemented as a counter or timestamp attached to or embedded in the data or process. Once the prescribed event count or timespan has elapsed, data is discarded or the event is cancelled.

Registered Jack—a standardized telecommunication network interface for connecting voice and/or data equipment to a network. Jacks are primarily named by the letters RJ, followed by two digits that express the type and a letter suffix to indicate minor variations.

Public Key—a cryptographic key that can be obtained and used by anyone to encrypt messages intended for a particular recipient, such that the encrypted messages can be deciphered only by using a second key that is known only to the recipient (the private key).

Diffie-Hellman Key Exchange—establishes a shared secret between two parties that can be used for secret communication for exchanging data over a public network. It uses the multiplicative group of integers modulo p, where p is prime, and g is a primitive root modulo p to ensure that the resulting shared Public Key can take on any value from 1 to p−1, expressed as $(A^b \mod p = g^{ab} \mod p = g^{ba} \mod p = B^a \mod p)$ where a,b and $(g^{ab} \mod p = g^{ba} \mod p)$ and the other values, p, g, $g^a \mod p$ and $g^b \mod p$, are kept secret. These two values are chosen in this way to ensure that the resulting shared secret can take on any value from 1 to p−1.

8P8C—The 8 position 8 contact (8P8C) connector is a modular connector commonly used to terminate twisted pair and multi-conductor flat cable. These connectors are commonly used for Ethernet over twisted pair, registered jacks and other telephone applications, RS-232 serial using the EIA/TIA-561 and Yost standards, and other applications involving unshielded twisted pair, shielded twisted pair, and multi-conductor flat cable. In a generic sense, it is commonly referred to as an 8P8C connector.

Random Number Generator—a method of producing random numbers based on microscopic phenomena that generate low-level, statistically random "noise" signals from thermal noise, photoelectric effects, beam splittering, and other quantum phenomena or from random network traffic monitored at the node which demonstrate complete unpredictability by using a transducer to convert selected aspect(s) of the physical phenomena to an electrical signal, thus, allowing the use of an amplifier and other electronic circuitry to increase the amplitude of the random fluctuations to a measurable level so that an analog to digital converter can be employed to convert the output into a digital number in order to repeatedly sample the randomly varying signal to produce an individual or a series of random numbers.

Throughout this document, the term "Registered Jack" or "8P8C" (Registered Jack specification 45) shall mean any 8-position 8-conductor keyed connector for one data line, with programming resistor, used for data transmission purposes.

INTRODUCTION

Embodiments of the present invention, the CipherLoc® Dynamic Pin Configurator (CLDPC) FIG. 1-1, is an external device that plugs into the 8P8C network port of a LAN capable computing device and provides dynamic rearrangement of the pin assignments on behalf of the network connector of the computing device when that computing device is attached to a Local Area Network (LAN) in order to prevent meaningful $3^{rd}$ party monitoring of the physical wiring of that LAN. It can also add unrelated and/or meaningless data (cryptonulls) to the transmission data stream, vary the transmission speed, change network protocol(s) or encrypt the data. The LAN connected computing device being protected could consist of a single device such as a computer, telephone, credit card machine, network interface card, printer/scanner, server, router, modem, etc. or an entire network of many such devices. FIGS. 1-3 and 1-4 show such a standard LAN (Hub 13-Firewall 14-Router 15) and WAN (Modem 16-External Network 17) configuration.

DESCRIPTION OF THE INVENTION

The CipherLoc® Dynamic Pin Configurator is based around the concept of a modular, mass-volume, rapidly upgradeable computing architecture with FIG. 1-1 being one example of what the invention might look like when implemented.

The basic principle relies on Field Programmable Gate Array (FPGA) processors or any other type of reconfigurable device(s) that may be initially configured at time of use or that is dynamically reconfigurable, requires very low power and will easily fit into a small metal shielded box acting as its heat sink, using passive cooling only. All of the complex parts—CPU, RAM, NAND Flash—are on a removable, hot-swappable PCMCIA card with all high-speed connectors, in particular Micro HDMI, SD/MMC or Micro-SD, Video In/Out, Device In/Out, LAN In/Out and USB-OTG, placed on the edge of the PCMCIA Card.

As shown in FIG. 1-1, the CLDPC has an external power supply that connects to the 68-pin PCMCIA connector and a pair of industry standard 8P8C (8P8C) female connectors for connection of the CLDPC to a LAN and a LAN attachable computing device.

The CLDPC invention has a firmware component that works in conjunction with the dedicated hardware features to manage all network and device monitoring, processing, maintenance, upgrades and error recovery.

Fundamental Characteristics

Embodiments of the present invention, the CipherLoc® Dynamic Pin Configurator (CLDPC) FIG. 1-1, is a dedicated, external device that plugs into the 8P8C network port of a LAN capable computing device and provides dynamic rearrangement of the pin assignments on behalf of the specific type of network connector of the computing device when that computing device is attached to a Local Area Network (LAN) in order to prevent meaningful 3$^{rd}$ party monitoring of the physical wiring of that LAN. The CLDPC is designed to be used in pairs. In addition to varying pin assignments, it can also add cryptonulls to the transmission data stream, vary the transmission speed, change network protocol(s) or encrypt the data.

Figures 1, 2:
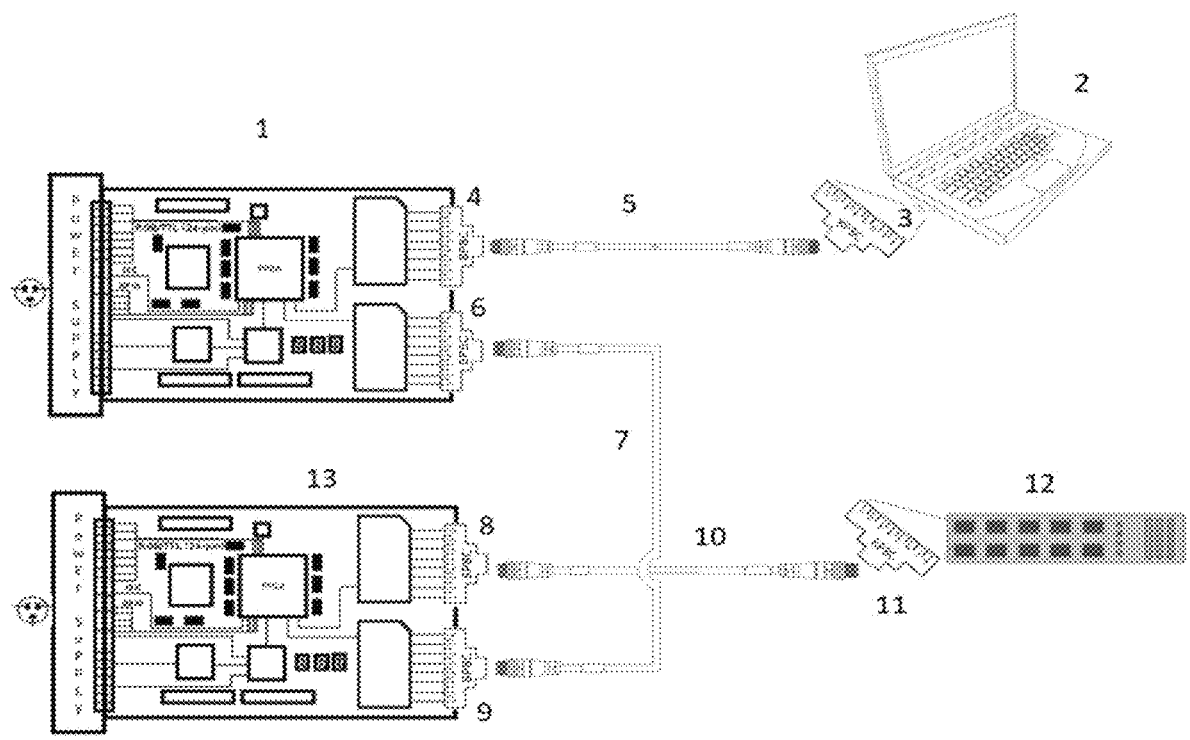

A detailed view, FIG. 1-2, illustrates how the CLDPC (items 1 and 13) is used to connect a computer (item 2) to a hard-wired computer network via standard, twisted-pair connections. First, a CLDPC (item 1) is used to connect to the computing device (item 2) by a standard, twisted-pair, male terminated, computer network cable (item 5) that is plugged into the computing devices', 8P8C female network communications port (item 3), and the other end of the cable is plugged into the invention's 8P8C, female, device port (item 4). Since the CLDPC is designed to work in pairs, it must communicate with another CLDPC. Therefore, a second CLDPC is connected to the computer network hub (item 12). This second CLDPC communicates with the first CLDPC via a standard, twisted-pair, 8P8C male terminated computer network cable (item 7) that is plugged into the first CLDPC's LAN port (item 6) and the second CLDPC's LAN port (item 9). The second CLDPC is connected to a standard network hub (item 12) by plugging one end of a standard, twisted-pair, 8P8C male terminated computer network cable (item 10) into a port (item 11) on the hub and the other end of the cable into the Device port (item 8) of the second CLDPC (item 13).

Figures 1, 2, 3:
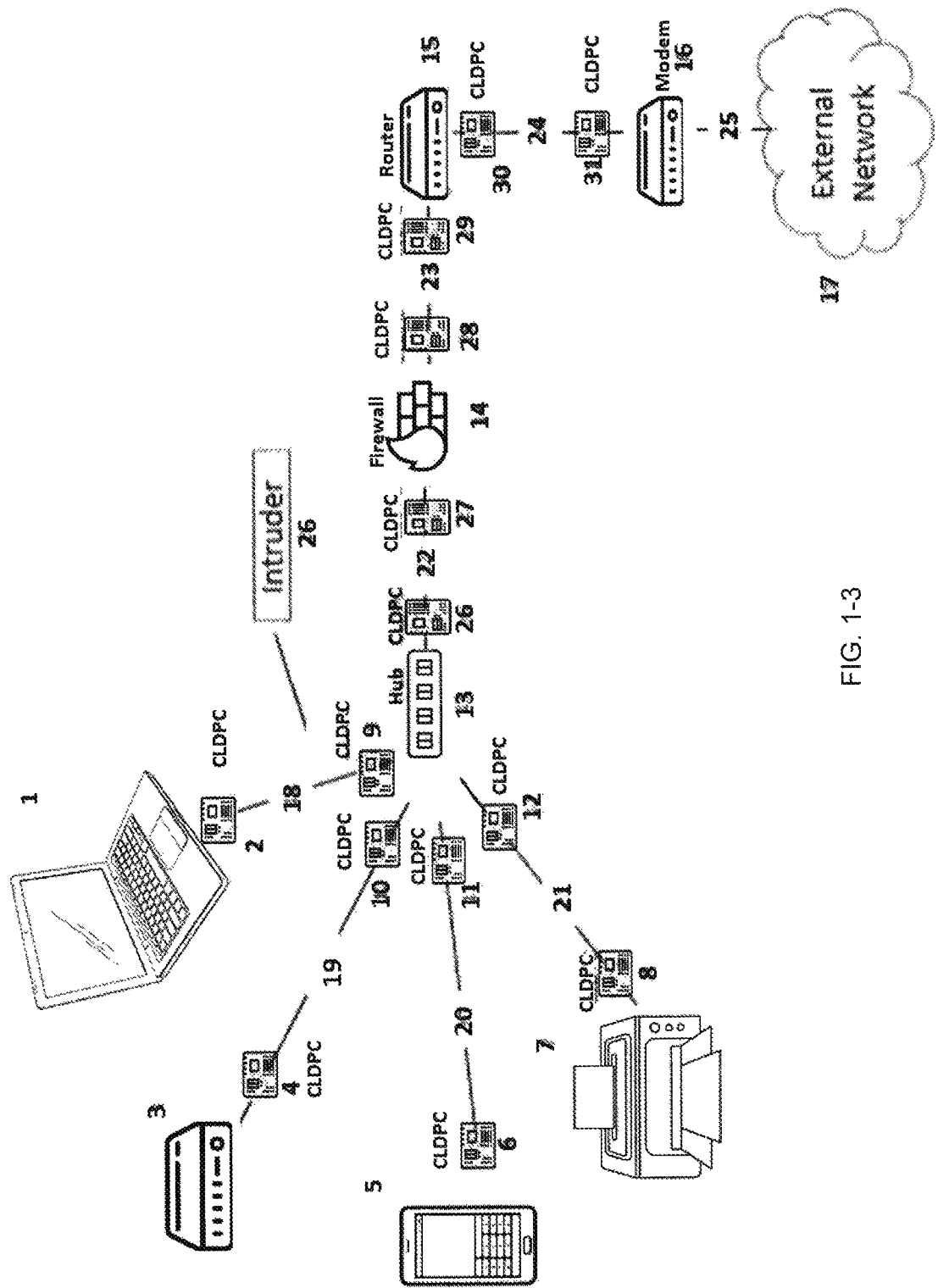
Figures 1, 2, 3, 4:
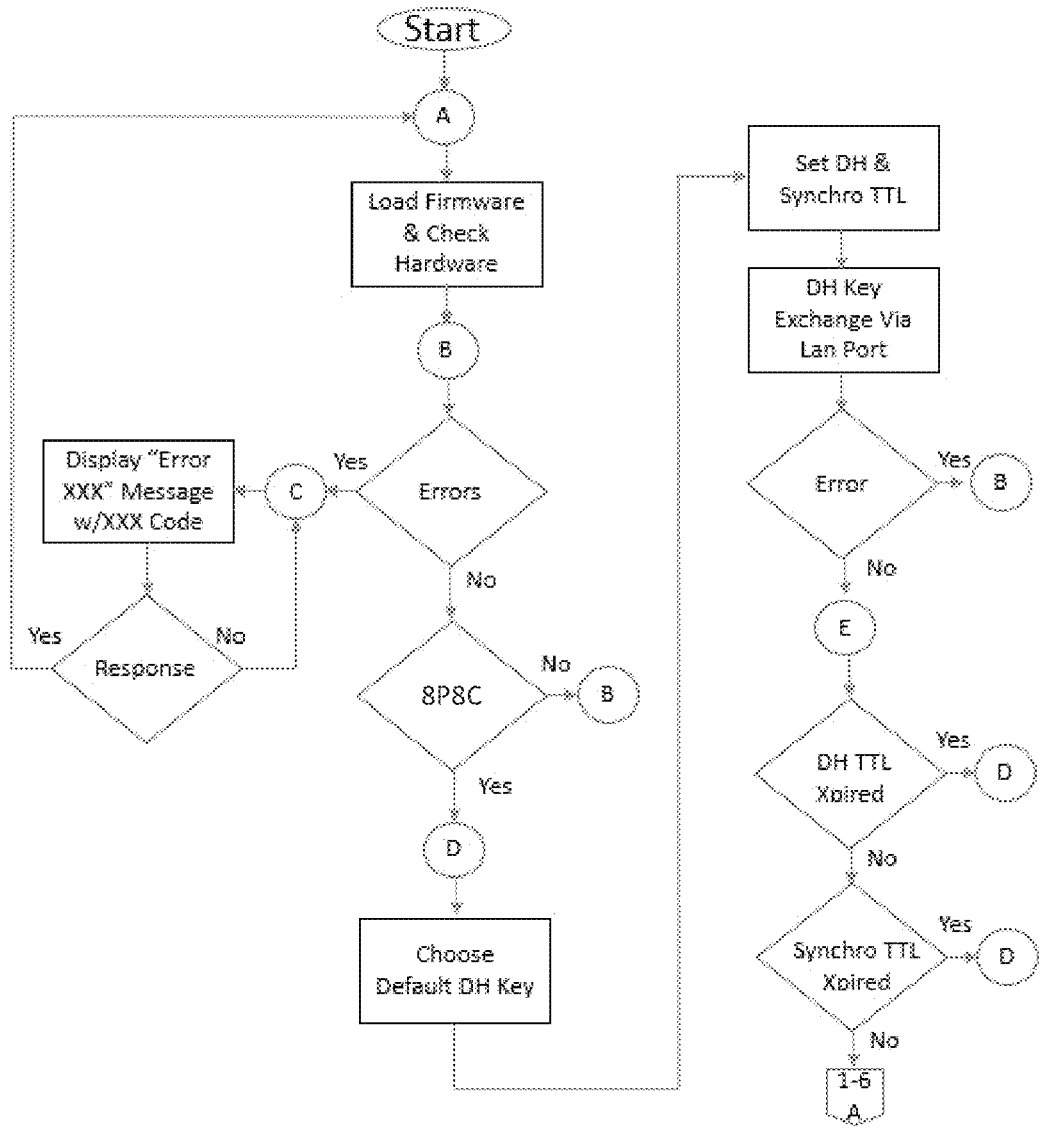
Figures 1, 2, 3, 4, 5:
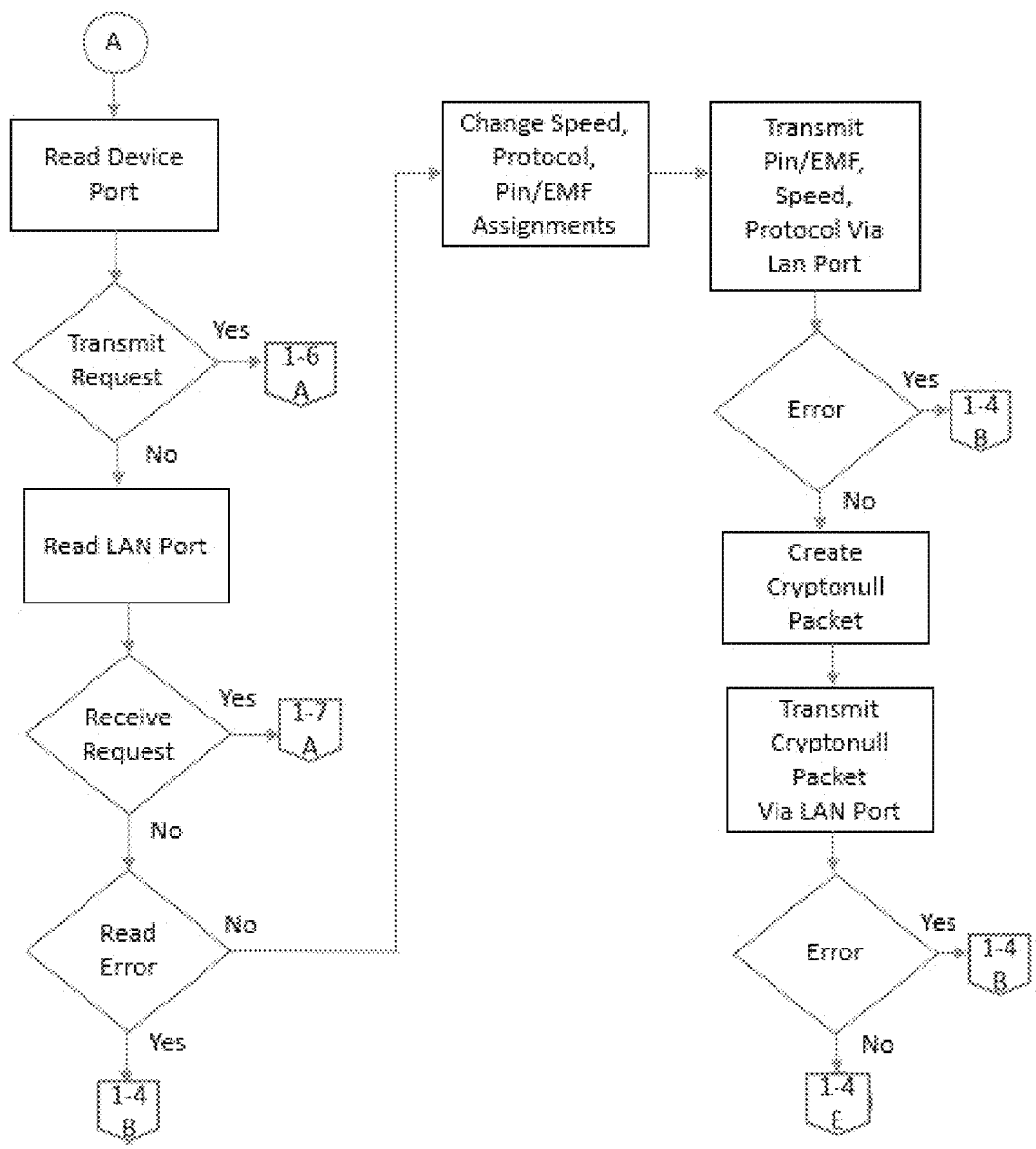
Figures 1, 2, 3, 4, 5, 6:
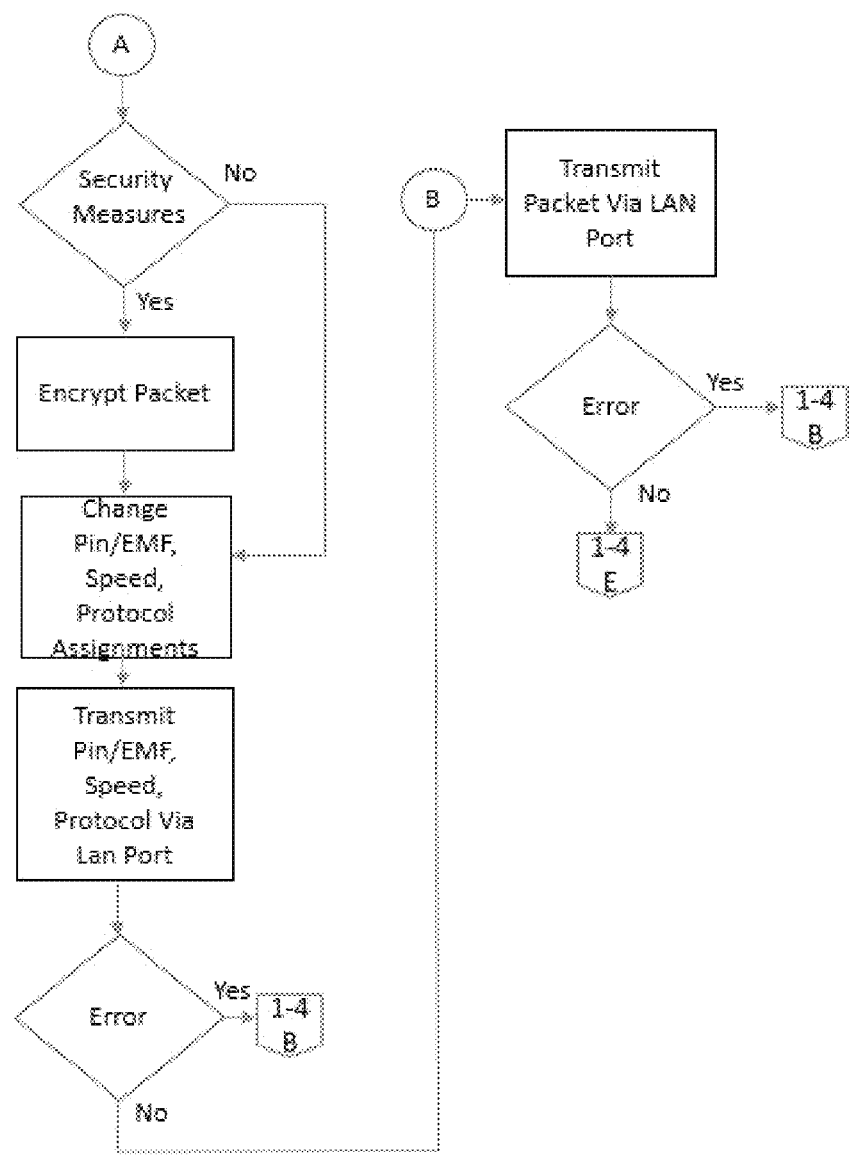
Figures 1, 2, 3, 4, 5, 6, 7:
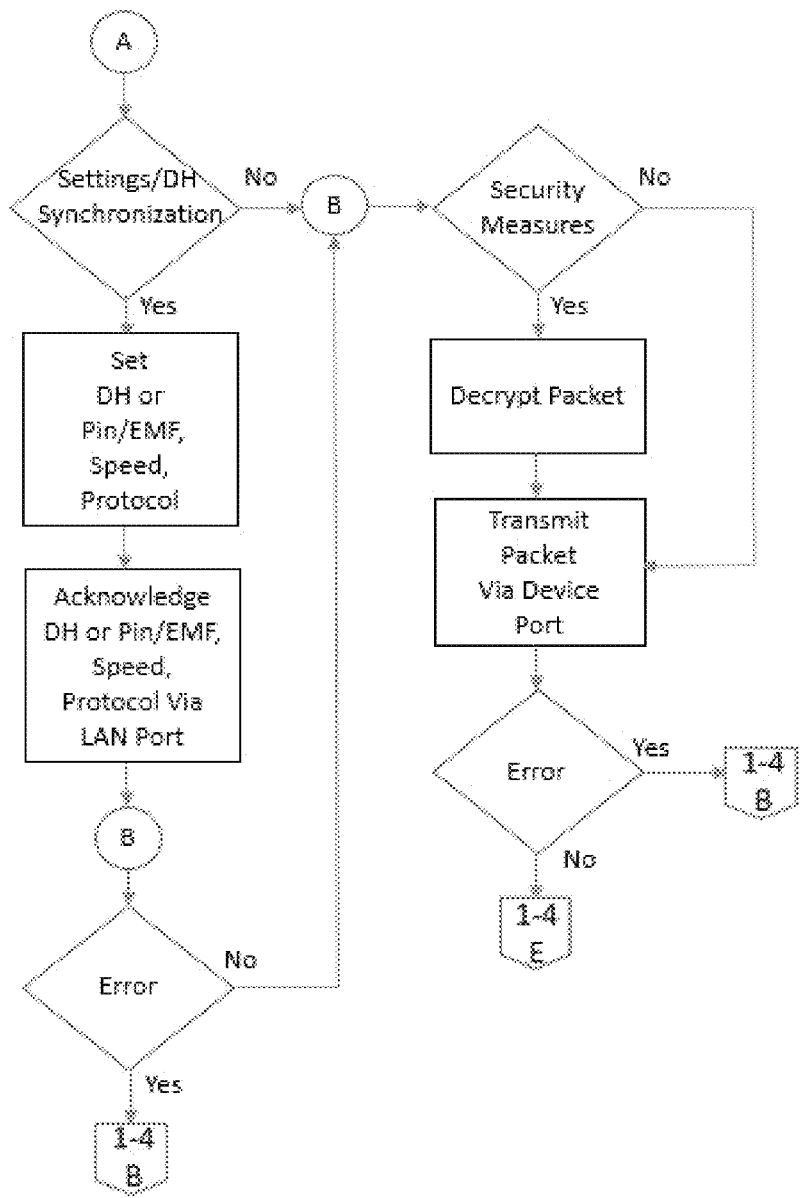
Figures 1, 2, 3, 4, 5, 6, 7, 8:
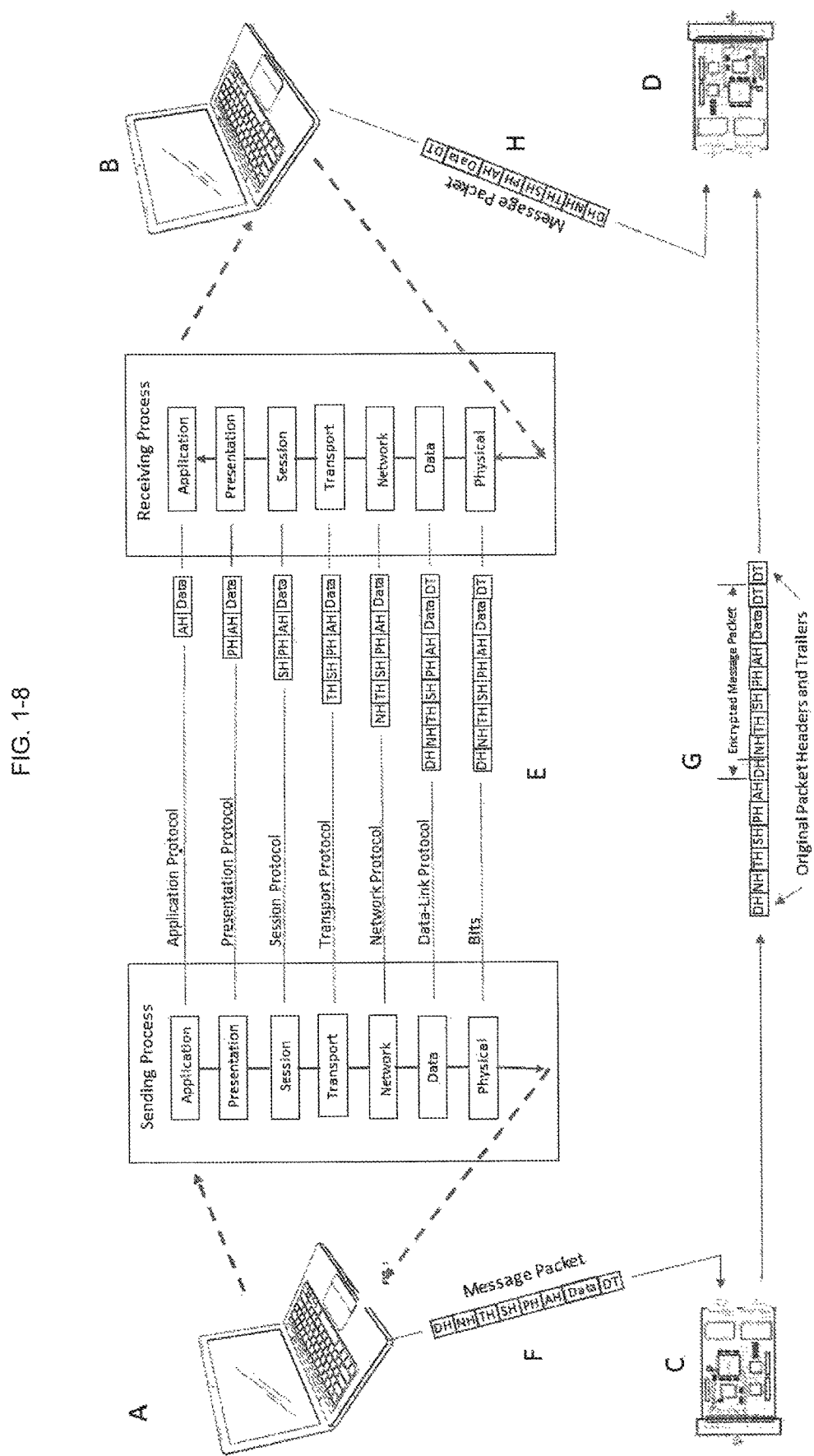
Figures 1, 3:
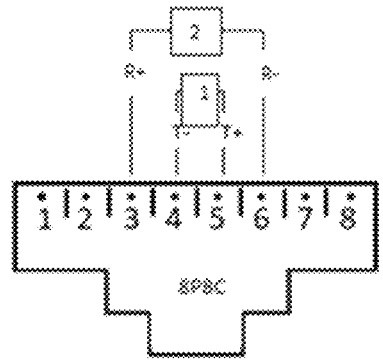
Figures 2, 3:
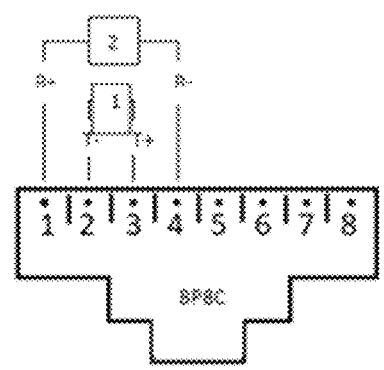

FIG. 1-3 illustrates a typical deployment of the invention within a typical LAN environment. The LAN connected computing device being protected could be a single device such as a computer, telephone, credit card machine, network interface card, printer/scanner, server, router, modem, etc. or an entire network of many such devices. FIG. 1-3 illustrates such a collection of devices shown as items 1, 3, 5, 7, 13, 14, 15 and 16 within a network.

Any embodiment of the present invention would have two 8-pin, 8-connector (8P8C) female connectors with one providing connection to/from the computing device and the other providing connection to/from the LAN.

Any embodiment of the present invention would follow the flow schematic shown in FIG. 1-4 thru 1-7 and upon CLDPC start up or expired Synchronization time-to-live or expired Diffie-Hellman time-to-live:

a. Verifies that a fully configured, male, 8P8C connector is inserted into the on-board, female, 8P8C, LAN connector by performing a floating-pin grounding test in which several varying voltages are used on each pin position to determine whether or not the electrical circuit is grounded for that pin position. Conductors that have a floating voltage are not connected electrically to another non-floating conductor and without such a connection, voltages and current flows are induced by electromagnetic fields or charge accumulation within the conductor rather than being due to the usual external potential difference of a power source. By testing in this manner, the CLDPC can determine if all of the 8 pins are available for use. If they are not available: an error message, code 1, is presented; the CLDPC stops until the error message is cleared; it performs the test again.

b. A Public Key, default, is generated for use by the Diffie-Hellman exchange, based on the use of a random number generator, as described above, resulting in the public key.

c. Sets a time-to-live for the DH key (TTL$_D$) based on the use of a random number generator, as described above, resulting in a time-to-live value for the DH key.

d. Sets a synchronization time-to-live (TTL$_s$) based on the use of a random number generator, as described above, resulting in a time-to-live value for synchronization.

e. A Diffie-Hellman exchange, as defined above, is performed through the LAN port of the CLDPC using the OSI Model and Telecommunications Protocols, as defined above, in which CLDPC (A) communicates with the next in-line (Receiving) CLDPC (B) to exchange the above generated Public Key.

f. Creates a cryptonull packet, illustrated in FIG. 1-8, item G, using randomly selected data (designated as data) from different sources such as random memory locations, buffered network traffic, time-to-live calculations as in the above descriptions and any combination of these items, formatted in the industry standard OSI Model.

g. Changes network protocol (e.g. from Ethernet to Token-Ring) based on the use of a random number generator, as described above, and uses the resulting random number(s) in the selection of a new network protocol.

h. Changes pin assignments on its 8P8C LAN port, thus, increasing the number of possible connections to be monitored by an intruder. Mathematically, this can best be described using the binomial theorem which states that it is possible to expand any power of x+y into a sum of the form $$(x+y)^n = \binom{n}{0}x^n y^0 + \binom{n}{1}x^{n-1}y^1 + \binom{n}{2}x^{n-2}y^2 + \ldots + \binom{n}{n-1}x^1 y^{n-1} + \binom{n}{n}x^0 y^n,$$

where each binomial coefficient $$\binom{n}{k}$$

is a specific positive integer. Using summation notation, it can be written as $$(x+y)^n = \sum_{k=0}^{n} \binom{n}{k} x^{n-k} y^k = \sum_{k=0}^{n} \binom{n}{k} x^k y^{n-k}$$

Figures 1, 2:
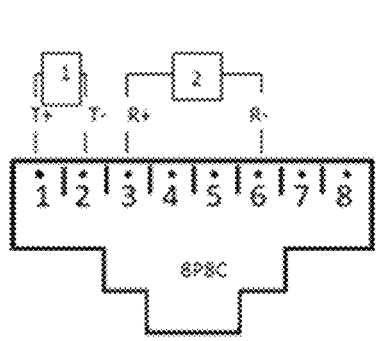
Figure 2:
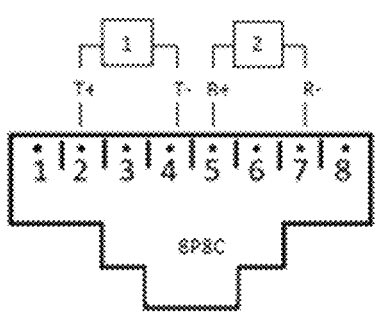
Figures 2, 70:
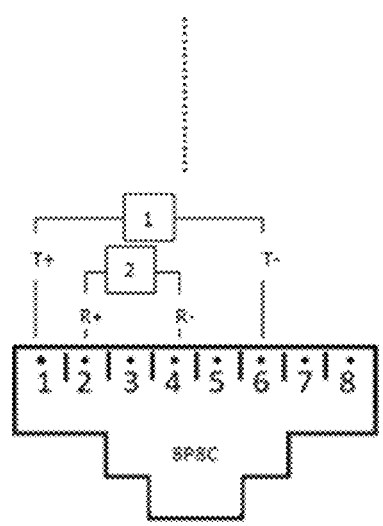
Figures 3, 70:
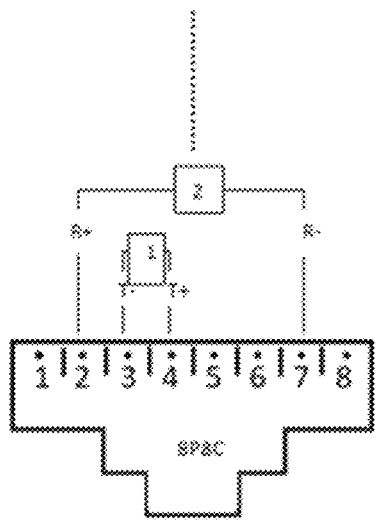

In data communications between computing devices attached to a LAN, the most commonly used method of attaching the computing device to the LAN is via 4-wire (T+, T−, R+ and R−) twisted pair terminated into an industry standard 8-pin 8-connector jack. Since the 8P8C jack has 8 pins and 4 pins, or channels, are needed, this can be expressed as the binomial co-efficient $$\binom{8}{4},$$

or '8 choose 4', which results in a total of 70 4-pin possibilities. FIG. 2-1 thru 2-70 show examples of such possible scenarios when the computing devices are using the Ethernet protocol and FIG. 3-1 thru 3-70 show examples of such possible scenarios when the computing devices are using the Token-Ring protocol. (Note: When using other protocols with standard 8P8C connectors, similar examples can be developed.) One of the 70 4-pin possibilities is selected based on the use of a random number generator, as described above, the results of which are then used to select the new 4-pin value.

i. Sets the transmission speed based on the use of a random number generator, as described above, resulting in a transmission speed value.

j. Through its LAN port, using the OSI Model and Telecommunications Protocols, as defined above, CLDPC (A) communicates with the next in-line (Receiving) CLDPC (B) as to what the new protocol and pin assignments are for the 8P8C LAN port by performing a Diffie-Hellman exchange, as defined above, using the above generated pin assignment(s).

k. Using the OSI Model and Telecommunications Protocols, as defined above, CLDPC (A) waits for acknowledgment from CLDPC (B).

l. Using the OSI Model and Telecommunications Protocols, as defined above, CLDPC (A) transmits the packet (as shown in FIG. 1-8, item G) using its LAN port, 8P8C pin assignments.

m. Using the OSI Model and Telecommunications Protocols, as defined above, CLDPC (A) waits for acknowledgment from receiving CLDPC (B).

n. Resets itself for the next set of packets by repeating above items b-j.

Any embodiment of the present invention would follow the flow schematic shown in FIG. 1-4-1-7 and when the CLDPC senses a request to transmit on behalf of the LAN attached computing device to which it is attached, as shown in FIG. 1-8, item A "Sending Process":

a. On its Device port, using the OSI Model and Telecommunications Protocols, as defined above, receives communications packets, as shown in FIG. 1-8, item F, from the computing device.

b. If configuration settings indicate encryption to be used, the CLDPC encrypts the content of the packets using the CipherLoc Polymorphic Key Progression Algorithm (U.S. Pat. No. 9,178,514 B1), formatted as shown in FIG. 1-8, item G.

c. Changes network protocol as indicated above (e.g. from Ethernet to Token-Ring), page 9, item g.

d. Changes pin assignments on its LAN port as indicated above, page 9, item h.

e. Sets transmission speed as indicated above, page 10, item i.

f. Using the OSI Model and Telecommunications Protocols, as defined above, communicates with the next in-line (Receiving) CLDPC as to what the new protocol, pin assignments and transmission speed are for its 8P8C connector.

g. Using the OSI Model and Telecommunications Protocols, as defined above, waits for acknowledgment from that CLDPC as to the new assignment(s).

h. Using the OSI Model and Telecommunications Protocols, as defined above, transmits the packet to the receiving CLDPC via its LAN port.

i. Using the OSI Model and Telecommunications Protocols, as defined above, waits for acknowledgment from the receiving CLDPC j. Resets itself for the next set of packets by repeating items b-j on pages 9-10.

Any embodiment of the present invention would follow the flow schematic shown in FIG. 1-5 thru 1-7 and when it senses a request to receive from another CLDPC, initiates its' Receiving Process:

a. On its LAN port, using the OSI Model and Telecommunications Protocols, as defined above, receives the packet, formatted as shown in FIG. 1-8, item G.

b. Using the OSI Model and Telecommunications Protocols, as defined above, acknowledges successful receipt of the packet to the transmitting CLDPC.

c. Maps the changed pin assignment back to the standard pin assignment for the Device port 8P8C connector.

d. Using the CipherLoc Polymorphic Key Progression Algorithm (U.S. Pat. No. 9,178,514 B1), decrypts the encrypted content of the packet, formatted as shown in FIG. 1-8, item G.

e. Using the OSI Model and Telecommunications Protocols, as defined above, transmits the decrypted packet to its Device Port so the computing device to which it is attached can receive the packet, as shown in FIG. 1-8, item H.

f. Resets itself for the next set of packets by repeating items b-j on pages 9-10.

The CipherLoc Dynamic Pin Configurator is designed to accommodate the CipherLac® Local Area Network Electronic Perimeter Security, patent pending, technology which has the ability to detect an intruder on a Local Area Network. This technology can detect the electronic signature of an intruder device on the LAN and assist the administrator of the LAN in taking proper action to contain, manage and/or remove the Intruder from the LAN.

Using FIG. 1-3, an Intruder device 26 is shown attached to the network on Communications Path 18 between the CLDPC 9, attached to a port on Hub 13, and the CLDPC 2 attached to the network interface device of laptop Computer 1. Inserted in this manner and because of the operational characteristics of a Hub (i.e. broadcasting the same message to all of its ports), the Intruder device would normally be able to observe all network traffic for Hub 13. Depending on the nature of the Intruder device, it could also perform destructive functions like injecting spurious network data traffic, generating false electrical signals, capturing transmitted data and a host of other destructive measures.

Operational Characteristics

Normal Operations of a Typical Network Environment without the Invention:

Using FIG. 1-3, computing devices 1, 3, 5, 7 and Hub 13, Firewall 14 and Router 15 form a Local Area Network (LAN). Each has its own internal address while Router 15 also has an external address for communicating with External Network 17.

If, for example, Computer 1 wants to send data to Computer 3:

1. Computer 1 places the data into a packet, formatted as shown in FIG. 1-8, item F. For identification and communication purposes computer 1 puts its own address, 192.168.1.2 (as an example), into the packet. The packet also includes the destination address, 192.168.1.3 (as an example), for Computer 3.

2. Using the OSI Model and Telecommunications Protocols, as defined above, computer 1 sends the packet over path 18 to Hub 13.
3. Using the OSI Model and Telecommunications Protocols, as defined above, hub 13 sends the packet to Firewall 14, which filters the packet by analyzing the data being transmitted in order to allow network traffic to be matched against firewall rules that are specific to individual services or applications.
4. Using the OSI Model and Telecommunications Protocols, as defined above, firewall 14 sends the packet to Router 15.
5. Router 15 determines whether or not to send the packet to Modem 16 or to another internal destination on the LAN. In this example the packet is destined for Computer 3 on the LAN.
6. Using the OSI Model and Telecommunications Protocols, as defined above, router 15 sends the packet to Firewall 14.
7. Using the OSI Model and Telecommunications Protocols, as defined above, firewall 14 performs its filtering function and then sends the packet to Hub 13.
8. Hub 13 rebroadcasts the packet through each of its internal ports.
9. Using the OSI Model and Telecommunications Protocols, as defined above, computers 1 and 3 each receive the packet, as do computing devices 5 and 7.
10. Each computing device reads the packet's destination address. Recognizing that It is not the intended destination, computer 1 and computing devices 5 and 7 ignore the packet. Computer 3, on the other hand, recognizes that it is the intended recipient of the packet and accepts it. It is noted that multiple packets are usually required to transmit data between computers 1 and 3.

If, for example, Computer 1 wants to send data to a device on External Network 17:
1. Computer 1 places the data into a packet, formatted as shown in FIG. 1-8, item F. The packet includes the source address (e.g. 192.168.1.2) and the destination address (e.g. 192.45.8.1).
2. Using the OSI Model and Telecommunications Protocols, as defined above, computer 1 sends the packet over path 18 to Hub 13.
3. Using the OSI Model and Telecommunications Protocols, as defined above, hub 13 then sends the packet to Firewall 14.
4. Using the OSI Model and Telecommunications Protocols, as defined above, firewall 14 receives the communication and filters the packet by analyzing the data being transmitted in order to allow network traffic to be matched against firewall rules that are specific to individual services or applications.
5. Using the OSI Model and Telecommunications Protocols, as defined above, firewall 14 then sends the packet to Router 15.
6. Using the OSI Model and Telecommunications Protocols, as defined above, router 15 receives the communication and determines whether or not to send the packet to Modem 16 or to another internal destination on the LAN.
7. Since the packet is destined for External Network 17, using the OSI Model and Telecommunications Protocols, as defined above, router 15 sends the packet to Modem 16.
8. Using the OSI Model and Telecommunications Protocols, as defined above, modem 16 broadcasts the packet through its external port to External Network 17.

If Router 15 receives a packet addressed to Computer 1 from External Network 17, by way of Communications Path 24 and Modem 16:
1. Using the OSI Model and Telecommunications Protocols, as defined above, router 15 sends the packet to Firewall 14.
2. Using the OSI Model and Telecommunications Protocols, as defined above, firewall 14 receives the communication and filters the packet by analyzing the data being transmitted in order to allow network traffic to be matched against firewall rules that are specific to individual services or applications.
3. Using the OSI Model and Telecommunications Protocols, as defined above, firewall 14 sends the packet to Hub 13.
4. Using the OSI Model and Telecommunications Protocols, as defined above, hub 13 receives the communication and rebroadcasts the packet through each of its internal ports.
5. Using the OSI Model and Telecommunications Protocols, as defined above, computers 1 and 3 each receive the packet, as do computing devices 5 and 7.
6. Each computing device reads the packet's destination address.
7. Recognizing that it is not the intended destination, computing devices 3, 5 and 7 ignore the packet.
8. Computer 1, on the other hand, recognizes that it is the intended recipient of the packet and accepts it.

Note: Network Appliances are available that combine the functions of Hub 13, Firewall 14 and Router 15.

Normal Operations of a Typical Network Environment with the Invention:

Using FIG. 1-3, computing devices 1, 3, 5, 7 and Hub 13, Firewall 14 and Router 15 form a Local Area Network. Each has its own internal address while Router 15 also has an external address for communicating with External Network 17. The invention, CipherLoc Dynamic Pin Configurator, is shown to be installed along Communications Path 18 at points 2 and 9; along Communications Path 19 at points 4 and 10; along Communications Path 20 at points 6 and 11; along Communications Path 21 at points 8 and 12; along Communications Path 22 at points 26 and 27; along Communications Path 23 at points 28 and 29; and, along Communications Path 24 at points 30 and 31.

With the invention installed as shown, if, for example, Computer 1 wants to send data to Computer 3:
1. Computer 1:
   a. Places the data into a packet as shown in FIG. 1-8, Item A, "Sending Process" resulting in the fully formed packet, Item E.
   b. For identification and communication purposes computer 1 puts its own address, 192.168.1.2 (as an example), into the packet. The packet also includes the destination address, 192.168.1.3 (as an example), for Computer 3.
   c. Using the OSI Model and Telecommunications Protocols, as defined above, computer 1 sends the packet, FIG. 1-8, Item F, out its communications port intending for it to go over path 18 to Hub 13.
2. CLDPC 2:
   a. On its Device port, using the OSI Model and Telecommunications Protocols, as defined above, receives communications packets from computer 1.

b. If configuration settings indicate encryption to be used, the CLDPC encrypts the content of the packets using the CipherLoc Polymorphic Key Progression Algorithm (U.S. Pat. No. 9,178,514 B1), formatted as shown in FIG. 1-8, item G
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 9 as to what the new protocol, pin assignments and transmission speed are for its 8P8C connector.
g. Using the OSI Model and Telecommunications Protocols, as defined above, waits for acknowledgment from CLDPC 9 as to the new assignment(s).
h. Using the OSI Model and Telecommunications Protocols, as defined above, transmits the packet to CLDPC 9 via the CLDPC 2 LAN port.
i. Using the OSI Model and Telecommunications Protocols, as defined above, waits for acknowledgment from CLDPC 9.
j. Resets itself for the next set of packets by repeating items b-j on pages 9-10.
1. CLDPC 9:
a. On its LAN port, using the OSI Model and Telecommunications Protocols, as defined above, receives the packet from CLDPC 2.
b. Using the OSI Model and Telecommunications Protocols, as defined above, acknowledges successful receipt of the packet to CLDPC 2.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so Hub 13 to which it is attached can receive the packet.
f. Resets itself for the next set of packets by repeating items b-j on pages 9-10.
2. Hub 13:
a. Using the OSI Model and Telecommunications Protocols, as defined above, hub 13 receives the packet sent by CLDPC 9.
b. Using the OSI Model and Telecommunications Protocols, as defined above, hub 13 sends the packet out its communications port intending for it to go over path 22 to Firewall 14.
3. CLDPC 26:
a. On its Device port, using the OSI Model and Telecommunications Protocols, as defined above, receives the communications packet from hub 13.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 27 as to what the new protocol, pin assignments and transmission speed are for its 8P8C connector.
g. Using the OSI Model and Telecommunications Protocols, as defined above, waits for acknowledgment from CLDPC 27 as to the new assignment(s).
h. Using the OSI Model and Telecommunications Protocols, as defined above, transmits the packet to CLDPC 27 via the LAN port on CLDPC 26.
i. Using the OSI Model and Telecommunications Protocols, as defined above, waits for acknowledgment from CLDPC 27.
j. Resets itself for the next set of packets by repeating items b-j on pages 9-10.
4. CLDPC 27:
a. On its LAN port, using the OSI Model and Telecommunications Protocols, as defined above, receives the packet from CLDPC 26.
b. Using the OSI Model and Telecommunications Protocols, as defined above, acknowledges successful receipt of the packet to CLDPC 26.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so firewall 14 to which it is attached can receive the packet.
f. Resets itself for the next set of packets by repeating items b-j on pages 9-10.
1. Firewall 14:
a. Using the OSI Model and Telecommunications Protocols, as defined above, firewall 14 receives the packet sent by CLDPC 27.
b. Firewall 14 filters the packet by analyzing the data being transmitted in order to allow network traffic to be matched against firewall rules that are specific to individual services or applications
c. Using the OSI Model and Telecommunications Protocols, as defined above, firewall 14 sends the packet out its communications port intending for it to go over Communications Path 23 to Router 15.
2. CLDPC 28:
a. On its Device port, using the OSI Model and Telecommunications Protocols, as defined above, receives the communications packet from firewall 14.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 29 as to what the new protocol, pin assignments and transmission speed are for its 8P8C connector.
g. Using the OSI Model and Telecommunications Protocols, as defined above, waits for acknowledgment from CLDPC 29 as to the new assignment(s)

h. Using the OSI Model and Telecommunications Protocols, as defined above, transmits the packet to CLDPC 29 via the LAN port on CLDPC 28.
i. Using the OSI Model and Telecommunications Protocols, as defined above, waits for acknowledgment from CLDPC 29.
j. Resets itself for the next set of packets by repeating items b-j on pages 9-10.

1. CLDPC 29:
a. On its LAN port, using the OSI Model and Telecommunications Protocols, as defined above, receives the packet from CLDPC 28.
b. Using the OSI Model and Telecommunications Protocols, as defined above, acknowledges successful receipt of the packet to CLDPC 28.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so router 15 to which it is attached can receive the packet.
f. Resets itself for the next set of packets by repeating items b-j on pages 9-10.

1. Router 15:
a. Using the OSI Model and Telecommunications Protocols, as defined above, router 15 receives the packet sent by CLDPC 29.
b. Router 15 determines whether or not to send the packet to Modem 16 or to another internal destination on the LAN.
c. In this example the packet is destined for Computer 3 on the LAN, so, using the OSI Model and Telecommunications Protocols, as defined above, Router 15 sends the packet out its communications port intending for it to go over Communications Path 23 to Firewall 14.

2. CLDPC 29:
a. On its Device port, using the OSI Model and Telecommunications Protocols, as defined above, receives the communications packet from router 15.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 28 as to what the new protocol, pin assignments and transmission speed are for its 8P8C connector.
g. Using the OSI Model and Telecommunications Protocols, as defined above, waits for acknowledgment from CLDPC 28 as to the new assignment(s)
h. Using the OSI Model and Telecommunications Protocols, as defined above, transmits the packet to CLDPC 28 via the LAN port on CLDPC 29.
i. Using the OSI Model and Telecommunications Protocols, as defined above, waits for acknowledgment from CLDPC 28.
j. Resets itself for the next set of packets by repeating items b-j on pages 9-10.

3. CLDPC 28:
a. On its LAN port, using the OSI Model and Telecommunications Protocols, as defined above, receives the packet from CLDPC 29.
b. Using the OSI Model and Telecommunications Protocols, as defined above, acknowledges successful receipt of the packet to CLDPC 29.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so firewall 14 to which it is attached can receive the packet.
f. Resets itself for the next set of packets by repeating items b-j on pages 9-10.

1. Firewall 14:
a. Using the OSI Model and Telecommunications Protocols, as defined above, firewall 14 receives the packet sent by CLDPC 28.
b. Firewall 14 filters the packet by analyzing the data being transmitted in order to allow network traffic to be matched against firewall rules that are specific to individual services or applications
c. Using the OSI Model and Telecommunications Protocols, as defined above, firewall 14 sends the packet out its communications port intending for it to go over Communications Path 22 to Hub 13.

2. CLDPC 27:
a. On its Device port, using the OSI Model and Telecommunications Protocols, as defined above, receives the communications packet from firewall 14.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 26 as to what the new protocol, pin assignments and transmission speed are for its 8P8C connector.
g. Using the OSI Model and Telecommunications Protocols, as defined above, waits for acknowledgment from CLDPC 26 as to the new assignment(s)
h. Using the OSI Model and Telecommunications Protocols, as defined above, transmits the packet to CLDPC 26 via the LAN port on CLDPC 27.
i. Using the OSI Model and Telecommunications Protocols, as defined above, waits for acknowledgment from CLDPC 26.
j. Resets itself for the next set of packets by repeating items b-j on pages 9-10.

1. CLDPC 26:
a. On its LAN port, using the OSI Model and Telecommunications Protocols, as defined above, receives the packet from CLDPC 27.

b. Using the OSI Model and Telecommunications Protocols, as defined above, acknowledges successful receipt of the packet to CLDPC 27.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so hub 13 to which it is attached can receive the packet.
f. Resets itself for the next set of packets by repeating items b-j on pages 9-10.

1. Hub 13:
a. Using the OSI Model and Telecommunications Protocols, as defined above, receives the packet sent by CLDPC 26.
b. Using the OSI Model and Telecommunications Protocols, as defined above, hub 13 sends the packet out its communications port intending for it to go over path 19 to Computer 3.

2. CLDPC 10:
a. On its Device port, using the OSI Model and Telecommunications Protocols, as defined above, receives the communications packet from hub 13.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 4 as to what the new protocol, pin assignments and transmission speed are for its 8P8C connector.
g. Using the OSI Model and Telecommunications Protocols, as defined above, waits for acknowledgment from CLDPC 4 as to the new assignment(s)
h. Using the OSI Model and Telecommunications Protocols, as defined above, transmits the packet to CLDPC 4 via the LAN port on CLDPC 10.
i. Using the OSI Model and Telecommunications Protocols, as defined above, waits for acknowledgment from CLDPC 4.
j. Resets itself for the next set of packets by repeating items b-j on pages 9-10.

1. CLDPC 4:
a. On its LAN port, using the OSI Model and Telecommunications Protocols, as defined above, receives the packet from CLDPC 10.
b. Using the OSI Model and Telecommunications Protocols, as defined above, acknowledges successful receipt of the packet to CLDPC 10.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so computer 3 to which it is attached can receive the packet.
f. Resets itself for the next set of packets by repeating items b-j on pages 9-10.

Note:
1) In a like manner to steps 16-18, Computers 1 and 3 each receive the packet, as do computing devices 5 and 7.
2) Each computing device reads the packet's destination address. Recognizing that it is not the intended destination, Computer 1 and computing devices 5 and 7 ignore the packet. Computer 3, on the other hand, recognizes that it is the intended recipient of the packet and accepts it. It is noted that multiple packets are usually required to transmit data between computers 1 and 3.

1. Computer 3:
a. Using the OSI Model and Telecommunications Protocols, as defined above, receives the packet, formatted as shown in FIG. 1-8, Item H
b. Processes the packet as shown in FIG. 1-8, Item B, "Receiving Process"
c. Processes the "Data" portion of the Packet With the invention installed as shown, if, for example, Computer 1 wants to send data to a computer located somewhere in the External Network, 17:

1. Computer 1:
a. Places the data into a packet as shown in FIG. 1-8, Item A, "Sending Process" resulting in the fully formed packet, Item E.
b. For identification and communication purposes computer 1 puts its own address, 192.168.1.2 (as an example), into the packet. The packet also includes the destination address, 192.168.1.3 (as an example), for Computer 3.
c. Using the OSI Model and Telecommunications Protocols, as defined above, computer 1 sends the packet, FIG. 1-8, Item F, out its communications port intending for it to go over path 18 to Hub 13.

2. CLDPC 2:
a. On its Device port, using the OSI Model and Telecommunications Protocols, as defined above, receives communications packets from computer 1.
b. If configuration settings indicate encryption to be used, the CLDPC encrypts the content of the packets using the CipherLoc Polymorphic Key Progression Algorithm (U.S. Pat. No. 9,178,514 B1), formatted as shown in FIG. 1-8, item G
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 9 as to what the new protocol, pin assignments and transmission speed are for its 8P8C connector.
g. Using the OSI Model and Telecommunications Protocols, as defined above, waits for acknowledgment from CLDPC 9 as to the new assignment(s).
h. Using the OSI Model and Telecommunications Protocols, as defined above, transmits the packet to CLDPC 9 via the CLDPC 2 LAN port.

i. Using the OSI Model and Telecommunications Protocols, as defined above, waits for acknowledgment from CLDPC 9.
j. Resets itself for the next set of packets by repeating items b-j on pages 9-10.

3. CLDPC 9:
a. On its LAN port, using the OSI Model and Telecommunications Protocols, as defined above, receives the packet from CLDPC 2.
b. Using the OSI Model and Telecommunications Protocols, as defined above, acknowledges successful receipt of the packet to CLDPC 2.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so Hub 13 to which it is attached can receive the packet.
f. Resets itself for the next set of packets by repeating items b-j on pages 9-10.

3. Hub 13:
a. Using the OSI Model and Telecommunications Protocols, as defined above, hub 13 receives the packet sent by CLDPC 9.
b. Using the OSI Model and Telecommunications Protocols, as defined above, hub 13 sends the packet out its communications port intending for it to go over path 22 to Firewall 14.

5. CLDPC 26:
a. On its Device port, using the OSI Model and Telecommunications Protocols, as defined above, receives the communications packet from hub 13.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 27 as to what the new protocol, pin assignments and transmission speed are for its 8P8C connector.
g. Using the OSI Model and Telecommunications Protocols, as defined above, waits for acknowledgment from CLDPC 27 as to the new assignment(s)
h. Using the OSI Model and Telecommunications Protocols, as defined above, transmits the packet to CLDPC 27 via the LAN port on CLDPC 26.
i. Using the OSI Model and Telecommunications Protocols, as defined above, waits for acknowledgment from CLDPC 27.
j. Resets itself for the next set of packets by repeating items b-j on pages 9-10.

6. CLDPC 27:
a. On its LAN port, using the OSI Model and Telecommunications Protocols, as defined above, receives the packet from CLDPC 26.
b. Using the OSI Model and Telecommunications Protocols, as defined above, acknowledges successful receipt of the packet to CLDPC 26.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so Firewall 14 to which it is attached can receive the packet.
f. Resets itself for the next set of packets by repeating items b-j on pages 9-10.

7. Firewall 14:
a. Using the OSI Model and Telecommunications Protocols, as defined above, firewall 14 receives the packet sent by CLDPC 27.
b. Firewall 14 filters the packet by analyzing the data being transmitted in order to allow network traffic to be matched against firewall rules that are specific to individual services or applications
c. Using the OSI Model and Telecommunications Protocols, as defined above, firewall 14 sends the packet out its communications port intending for it to go over Communications Path 23 to Router 15.

8. CLDPC 28:
a. On its Device port, using the OSI Model and Telecommunications Protocols, as defined above, receives the communications packet from firewall 14.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 29 as to what the new protocol, pin assignments and transmission speed are for its 8P8C connector.
g. Using the OSI Model and Telecommunications Protocols, as defined above, waits for acknowledgment from CLDPC 29 as to the new assignment(s)
h. Using the OSI Model and Telecommunications Protocols, as defined above, transmits the packet to CLDPC 29 via the LAN port on CLDPC 28.
i. Using the OSI Model and Telecommunications Protocols, as defined above, waits for acknowledgment from CLDPC 29.
j. Resets itself for the next set of packets by repeating items b-j on pages 9-10.

9. CLDPC 29:
a. On its LAN port, using the OSI Model and Telecommunications Protocols, as defined above, receives the packet from CLDPC 28.
b. Using the OSI Model and Telecommunications Protocols, as defined above, acknowledges successful receipt of the packet to CLDPC 28.
c. Maps the changed pin assignment back to the standard pin assignment for the Device port 8P8C connector.

d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so router 15 to which it is attached can receive the packet.
f. Resets itself for the next set of packets by repeating items b-j on pages 9-10.

10. Router 15:
a. Using the OSI Model and Telecommunications Protocols, as defined above, router 15 receives the packet sent by CLDPC 29.
b. Router 15 determines whether or not to send the packet to Modem 16 or to another internal destination on the LAN.
c. In this example the packet is destined for External Network 17, so, using the OSI Model and Telecommunications Protocols, as defined above, Router 15 sends the packet out its communications port intending for it to go over Communications Path 24 to Modem 16.

11. CLDPC 30:
a. On its Device port, using the OSI Model and Telecommunications Protocols, as defined above, receives the communications packet from router 15.
b. If configuration settings indicate encryption to be used, the CLDPC encrypts the content of the packets using the CipherLoc Polymorphic Key Progression Algorithm (U.S. Pat. No. 9,178,514 B1).
c. Changes network protocol as indicated above (e.g. from Ethernet to Token-Ring), page 9, item g.
d. Changes pin assignments on its LAN port as indicated above, page 9, item h.
e. Sets transmission speed as indicated above, page 10, item i.
f. Using the OSI Model and Telecommunications Protocols, as defined above, communicates with CLDPC 31 as to what the new protocol, pin assignments and transmission speed are for its 8P8C connector.
g. Using the OSI Model and Telecommunications Protocols, as defined above, waits for acknowledgment from CLDPC 31 as to the new assignment(s)
h. Using the OSI Model and Telecommunications Protocols, as defined above, transmits the packet to CLDPC 31 via the LAN port on CLDPC 30.
i. Using the OSI Model and Telecommunications Protocols, as defined above, waits for acknowledgment from CLDPC 31.
j. Resets itself for the next set of packets by repeating items b-j on pages 9-10.

12. CLDPC 31:
a. On its LAN port, using the OSI Model and Telecommunications Protocols, as defined above, receives the packet from CLDPC 30.
b. Using the OSI Model and Telecommunications Protocols, as defined above, acknowledges successful receipt of the packet to CLDPC 30.
c. Maps the changed pin assignment back to the standard pin assignment for the Device port 8P8C connector.
d. Using the CipherLoc Polymorphic Key Progression Algorithm (U.S. Pat. No. 9,178,514 B1), decrypts the encrypted content of the packet, formatted as shown in FIG. 1-8, item G.
e. Using the OSI Model and Telecommunications Protocols, as defined above, transmits the decrypted packet to its Device Port so modem 16 to which it is attached can receive the packet.
f. Resets itself for the next set of packets by repeating items b-j on pages 9-10.

Note: Network Appliances are available that combine the functions of Hub 13, Firewall 14 and Router 15.

As shown in FIG. 1-3, because of the presence of CipherLoc Dynamic Pin Configurators 2 and 9, any data captured by Intruder 26 is useless to them because of the operational characteristics of the CLDPC as explained in this section.

CONCLUSION

The CipherLoc Dynamic Pin Configurator is a method of protecting information as it moves from one computer to another via modern infrastructure. It does not rely on encryption, although it is recommended such measures continue to be used, but, rather, is a detachable electronic device that can be used to protect information as it moves from one computer to another via a Local Area Network.

Any embodiment of the present invention, the CipherLoc® Dynamic Pin Configurator (CLDPC) FIG. 1-1, is a dedicated, external device that plugs into the network/LAN port of a LAN capable computing device and provides dynamic rearrangement of the pin assignments on behalf of the computing device when that computing device is attached to a Local Area Network (LAN) in order to confuse and prevent meaningful $3^{rd}$ party monitoring of the physical wiring of that LAN. It can also add unrelated data to the transmission data stream, vary the transmission speed, change network protocol(s) or encrypt the data.

The CipherLoc Dynamic Pin Configurator is designed to accommodate the CipherLoc® Local Area Network Electronic Perimeter Security, patent pending, technology which has the ability to detect an intruder on a Local Area Network. This technology can detect the electronic signature of an intruder device on the LAN and assist the administrator of the LAN in taking proper action to contain, manage and/or remove the Intruder from the LAN.

When the CipherLoc Dynamic Pin Configurator is used with the CipherLoc PKPA Cipher Engine, U.S. Pat. No. 9,178,514 B1, and the CipherLoc® Local Area Network Electronic Perimeter Security, patent pending, technology which has the ability to detect an intruder on a Local Area Network, a maximum level of computer communications security can be achieved. In such an environment, any information an intruder might capture from the protected network, assuming the intruder was yet to be detected and neutralized, is useless to them as they would have no idea of the correct ordering of the content of the captured bit-stream in their possession.

While flow charts FIG. 1-4 thru 1-7 show a specific order of execution, the order of execution may differ from those depicted. For example, the order of execution of two or more blocks may be scrambled relative to the order shown. Also, two or more blocks shown in succession may be executed concurrently or with partial concurrence. All such variations are within the scope of the present invention.

Embodiments of the present invention have been shown and described with reference to the foregoing exemplary implementations. It is to be understood, however, that other forms, details, and embodiments may be made without departing from the spirit and scope of the invention which is defined in the following claims.

The invention claimed is:

1. A method for securing a computer LAN having a number of network assets connected, comprising:
   a. verifying that a fully configured male, 8P8C connector is inserted into a female, 8P8C LAN connector of a first network asset;
   b. generating a public key default for use by a Diffie-Hellman exchange;
   c. setting a time-to-live for the Diffie-Hellman public key;
   d. setting a synchronization time-to-live on the Diffie-Hellman public key;
   e. performing a Diffie-Hellman exchange to exchange the public key default with a next in line network asset;
   f. creating a crypto-null packet;
   g. changing the network protocol based on the use of a random number generator;
   h. changing the pin assignments on the 8P8C LAN port, thus increasing the number of possible connections to be monitored by an intruder;
   i. setting the transmission speed based on the use of another random number generator, resulting in a transmission speed value; and
   j. communicating through the LAN port to a next in line receiving network asset as to what the new protocol and pin assign assignments are for the 8P8C LAN port by performing a Diffie-Hellman exchange, as defined above, using the above generated pin assignments.

2. The method according to claim 1 wherein step a) is achieved by performing a floating-pin grounding test in which several varying voltages are used on each pin position to determine whether or not the electrical circuit is grounded for that pin position.

3. The method according to claim 1 wherein said public key default of step b) is generated based on a random number generator.

* * * * *